J. WHITAKER.
Car-Axle Journals.
No. 145,035. Patented Nov. 25, 1873.
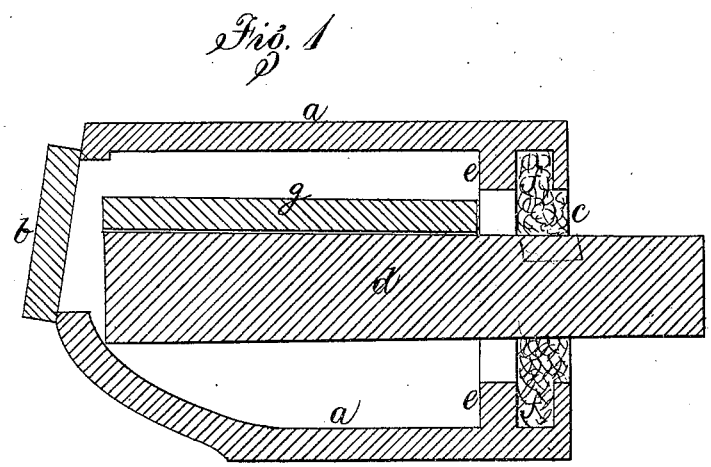
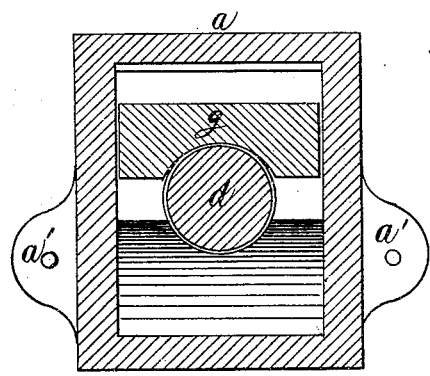
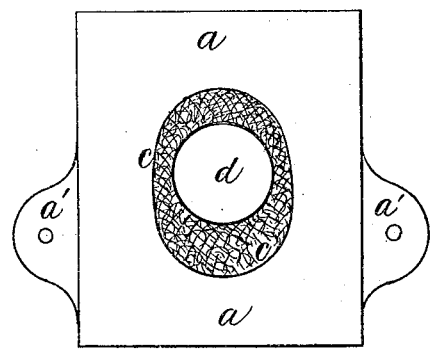

UNITED STATES PATENT OFFICE.

JOSEPH WHITAKER, OF WOONSOCKET, RHODE ISLAND, ASSIGNOR TO SIMEON S. COOK, OF SAME PLACE.

IMPROVEMENT IN CAR-AXLE JOURNALS.

Specification forming part of Letters Patent No. 145,035, dated November 25, 1873; application filed July 14, 1873.

*To all whom it may concern:*

Be it known that I, JOSEPH WHITAKER, of Woonsocket, in the county of Providence and State of Rhode Island, have invented certain Improvements in Shafts or Journals for Car-Wheels, &c., of which the following is a specification:

The present invention relates to a certain new and useful improvement in car-wheel and other journals or shafts, by which improvement the oil or other lubricating matter is retained in its proper receptacle, so as to insure economy and cleanliness, and reduce the expense, labor, and annoyance heretofore incurred by leakage and frequent and imperfect lubrication. My improvement consists in a journal or shaft arranged and operating as will be hereinafter more fully explained, so that the oil or other lubricating matter, introduced and contained in a lubricating-box suitably closed and packed, and provided with a bearing and any desired arrangement for lubricating the shaft or journal, is, by the centrifugal force induced by the rotation of the shaft or journal, carried automatically and continuously from the inner and narrow end toward the outer and large end of the journal or shaft, and away from the inner or packed end of the box.

In the drawings, $a$ represents a lubricating-box, curved on the bottom of the outer end, which is formed with side lugs $a'$, to receive the screw ends of a cover, $b$, which may be screwed, hinged, or adjusted to the end of the box $a$ in any desired manner that will allow of easy access to the box for introducing the oil or other lubricating matter. The inner end of the box $a$ is formed with an aperture, $c$, of an elliptical or other desired shape, to admit of the insertion and play of a shaft or journal, $d$, which extends longitudinally within the box $a$, and is formed of a tapering shape, enlarging in diameter from the inner end, with which the wheel or other operating device is connected, toward the outer end contained within the box. The box $a$, within the inner end, is formed with an elliptical or other desired shaped flange, $e$, leaving a recess or groove, $f$, for the reception of any suitable packing. Within the upper portion of the box $a$ is arranged, as usual in car-wheel boxes, a loose longitudinal journal-bearing, $g$, and the box may be supplied with any arrangement for lubricating the shaft or journal that may be desired.

By the above description, reference being had to the drawings, it will readily be seen that, by tapering the journal or shaft $d$ from the box end toward the wheel end, the oil is, by the centrifugal force induced by the rotation of the shaft of the journal, carried up on the shaft or journal, away from the inner or packed end, toward the outer and closed end of the box, thereby preventing leakage and waste of the oil, and keeping the shaft or journal constantly and evenly lubricated and the box well supplied with oil, which is thus required to be introduced less frequently than heretofore, thereby saving time, labor, and expense.

By obviating the leakage of the oil at the wheel end of the box by the manner above described, the outside of the packing end of the box is kept in a cleaner condition, with the expense of less time and trouble, than when arranged with an ordinarily-constructed journal or shaft.

Having thus fully described my improvement, what I claim as my invention, and desire to have secured to me by Letters Patent, is—

The shaft or journal $d$, tapering outward from its inner to its outer end, in combination with the lubricating-box $a$, having the groove $f$ at its inner end, adapted to hold the packing and supply the lubricant to the inner end of the journal, substantially as described, for the purpose specified.

In testimony whereof I have signed my name to this specification in the presence of two subscribing witnesses.

JOSEPH WHITAKER.

Witnesses:
EDWIN ALDRICH,
ALBERT COOK.